United States Patent [19]

Himmler

[11] Patent Number: 4,905,515

[45] Date of Patent: Mar. 6, 1990

[54] BAR SPRING SUPPORT FOR A ROTOR SHAFT HOUSING IN AN OSCILLATION MEASURING DEVICE

[75] Inventor: Günther Himmler, Darmstadt, Fed. Rep. of Germany

[73] Assignee: Gebr. Hofmann GmbH & Co. KG Maschinenfabrik, Darmstadt, Fed. Rep. of Germany

[21] Appl. No.: 193,743

[22] Filed: May 13, 1988

[30] Foreign Application Priority Data

May 14, 1987 [DE] Fed. Rep. of Germany ....... 3716210

[51] Int. Cl.⁴ ............................................. G01M 1/16
[52] U.S. Cl. ....................................... 73/471; 73/476
[58] Field of Search ................. 73/471, 472, 473, 475, 73/476, 477, 479

[56] References Cited

U.S. PATENT DOCUMENTS

| | | | |
|---|---|---|---|
| 2,724,971 | 11/1955 | Kroft et al. | 73/476 |
| 3,584,512 | 6/1971 | Hahn et al. | 73/475 |
| 4,543,825 | 10/1985 | Schonfeld et al. | 73/472 |

Primary Examiner—John Chapman
Attorney, Agent, or Firm—Fleit, Jacobson, Cohn, Price, Holman & Stern

[57] ABSTRACT

A device for measuring rotor imbalance of a rotor is disclosed. The rotor shaft housing support for the shaft for a rotor to be balanced in a machine includes two pairs of springs disposed in two parallel planes. Each pair of springs consists of two parallel bar or rod springs that support the rotor shaft housing support in a plane of oscillation coincident with the shaft of the rotor on the machine stand in such a way that it oscillates. Each of the two bar or rod springs of each pair of springs forms part of a single-piece frame. Mounting strips are attached to the machine stand and to the rotor shaft housing.

2 Claims, 1 Drawing Sheet

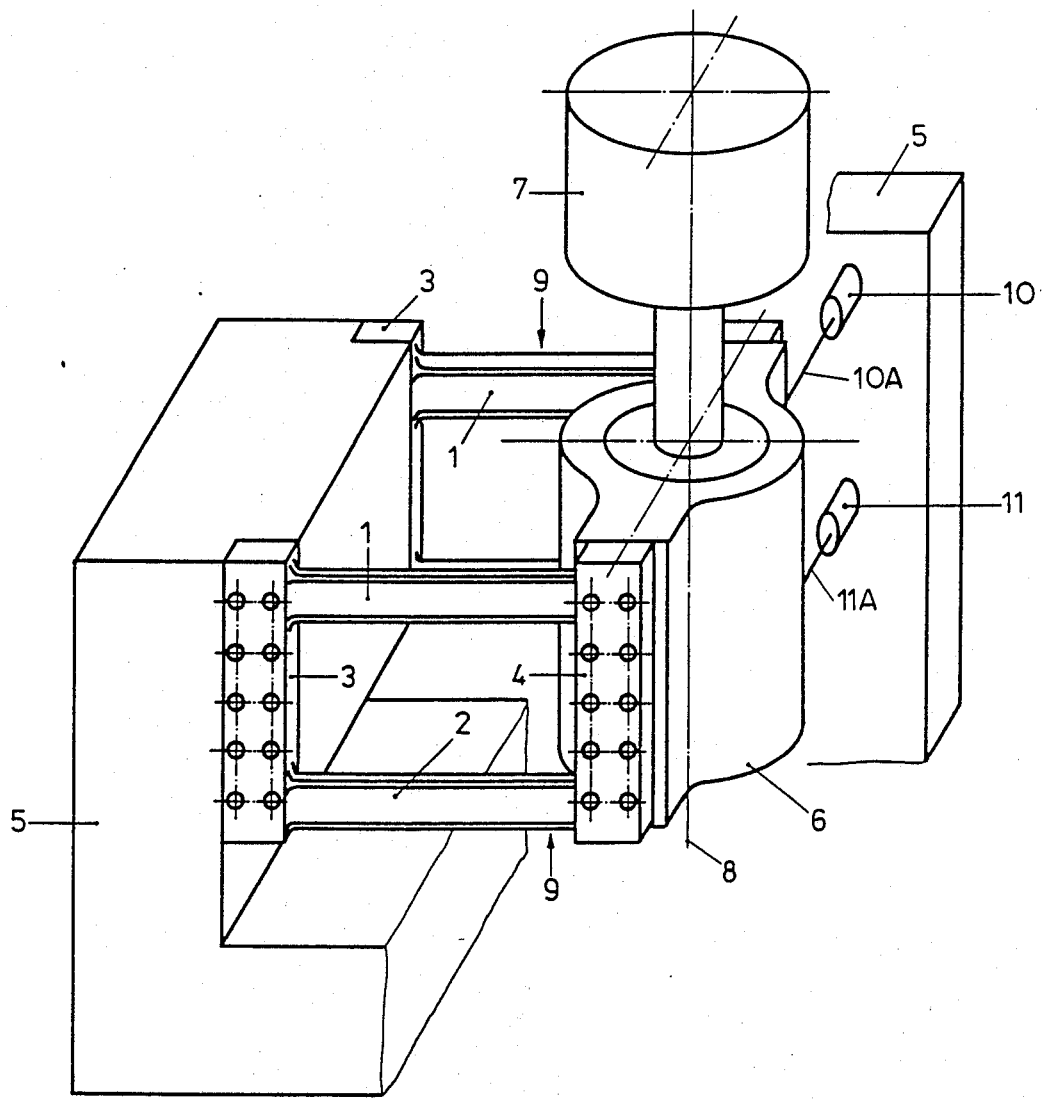

BAR SPRING SUPPORT FOR A ROTOR SHAFT HOUSING IN AN OSCILLATION MEASURING DEVICE

BACKGROUND OF THE INVENTION

This invention relates to a device for measuring the oscillations of an oscillating support for the shaft of a rotor, upon which a rotor to be balanced in a balancing machine is mounted. The balancing machine measures the amount of imbalance of the rotor in two planes.

The device comprises two pairs of two parallel bar springs, each spring of a pair mounted in the same direction in which the axis of the rotor extends and at a distance from the other spring of the pair. The springs support a rotor shaft housing on a machine stand in such a way that they oscillate within a plane of oscillation that contains the axis of the rotor. During dynamic balancing, the imbalance of a rotor is measured in two separate planes that are parallel to the axis of the rotor, and to which devices picking up the measuring values have been assigned. In order to accurately ascertain the amount of imbalance, it is necessary to separate the imbalance measurement in one plane from the imbalance measurement in the other plane. Any effects of one plane acting on the other plane have to be suppressed.

Disadvantageous effects on measured results have been known to arise in devices of this sort, especially from fastening sites on the ends of the springs. The difficulty is due to the fact that the fastening sites on the end of each spring may be below the rigidity of the spring. The path of oscillation caused by the imbalance of the revolving rotor is thereby partly determined by the rigidity of the spring connection at each spring end. Modifications of the connections affect the amplitudes and the phase relationships of the oscillatory movements. This causes difficulties in the separation of the planes in which measuring takes place. In addition, even small manufacturing defects at the sites of fastening of the springs bring about considerable stresses in the oscillating spring system.

Accordingly, it is a primary object of the invention to create a device of the type mentioned at the outset, and in which an exactly defined spring setting is achieved at the fastening sites of the spring ends connecting the machine stand with the rotor shaft housing or mounting.

SUMMARY OF THE INVENTION

By means of the invention, a frame-like unit comprising two single piece spring frames, each including two springs and two mounting strips which provide connections with the machine stand and the rotor shaft housing, is achieved. Due to the connection of the springs to the mounting strips, the spring setting is defined precisely, and the rigidity of the end connections of the springs is considerably greater than in conventional devices.

In this way, the amplitude and the phase relationship of the oscillating movement of the spring is practically independent of the spring end connections. The phase shift between the oscillating movements of the two bar springs forming a pair of springs is practically zero. In this way, a maximal separation of the planes previously mentioned may be achieved.

In addition, there are advantages during assembly. The springs form part of a frame that comprises the two bar springs and the two mounting strips. Moreover, the positions of the two bar springs of each pair of springs are fixed automatically by attachment of the mounting strips to the machine base or mounting stand and to the rotor shaft housing. In this way, aligning and assembling of each frame-like unit on a machine base or mounting stand is simplified considerably.

BRIEF DESCRIPTION OF THE DRAWING

The invention is illustrated in the drawing FIGURE, which is a perspective view of the device as it appears when a rotor is mounted in the device for measurement of the amount of rotor imbalance.

DESCRIPTION OF THE PREFERRED EMBODIMENT

The invention will now be explained in more detail, using as an example the embodiment illustrated in the drawing FIGURE.

The schematic drawing FIGURE shows, in a perspective view, a rotor shaft housing or mounting 6, which mounts a rotor 7 which is to be balanced. The rotor 7 is mounted to and supported by an axle or shaft in the rotor shaft housing or bearing 6. The axle or shaft may also be a balancing spindle that is assigned to the rotor shaft housing 6, and on which the rotor 7 may be fixed.

During the process of measuring the imbalance of the rotor 7, the rotor 7 revolves around an axis 8. The axis 8 also constitutes a central axis of the rotor shaft housing 6. The oscillations generated by the imbalance of the rotor 7 as the rotor 7 revolves around axis 8 are measured by means of devices 10 and 11, which pick up and measure the generated oscillations. The rotor shaft housing 6 is supported on a machine stand 5 by two pairs of leaf or bar springs 1 and 2. The leaf or bar springs 1 and 2 of each pair of springs are longitudinally parallel to one another. The two bar springs of each pair of springs form, together with mounting strips 3 and 4, a four-sided single-piece frame 9. The two single-piece frames 9 are mounted in planes which are parallel to one another and to the axis 8 of the rotor. The planes in which the frames are mounted are equidistant from the rotor axis. The rotor axis is positioned between the two planes in which the two frames 9 are mounted. The two bar springs 1 and 2 of each frame 9 are disposed at a distance from one another, in the direction of the axis 8.

The mounting strip 3 of each frame 9 is inserted into a recess in the machine stand 5 and rigidly connected in a form-locking manner with the machine stand by bolts or rivets, for example. The mounting strip 4 of each frame 9 is similarly rigidly connected with outwardly extending protrusions of the rotor shaft housing 6 in a form-locking manner. As is clear from the drawing FIGURE, springs 1 and 2 are perpendicular to a plane passing through mounting strips 4 of frames 9 and through rotor axis 8.

The angular impulses or inertial moments of the mounting strips 3, 4 are considerably greater than the inertial moments of the two bar springs 1 and 2. In the described manner, the rotor shaft housing 6 is mounted to the machine stand 5 by two spring frame systems formed by the frames 9. The mounting strips 3, 4 are preferentially connected to machine stand 5 and rotor shaft housing 6, respectively, in an integral or nondetachable manner, but may also be detachably mounted to the stand and/or rotor bearing. In the embodiment of the invention shown in the drawing, the rotor shaft is vertically oriented, while the two bar springs 1 and 2 of each frame 9 are horizontally oriented. Of course, it is also possible to mount the rotor shaft horizontally, in which case the two bar springs 1 and 2 of each frame 9 are vertically oriented. In most applications, the rod springs 1 and 2 of each frame 9 have identical inertial moments. In certain cases, however, it is necessary to ensure, by varying corresponding measurements of the inertial moments for the rod springs 1 and 2 of each frame 9, that the oscillation node is located, in the direction of the rotor axis, between the two devices 10 and 11 that pick up the measured rotor imbalance values in order to compensate for the weight of the rotor. This is intended to assure that the oscillation node is not located on the measuring lines 10A and 11A of the two devices 10 and 11 that pick up the measured rotor imbalance values. Preferably, the oscillation node should be located, in the direction of the rotor axis, between the two measuring lines 10A and 11A of the devices 10 and 11 that pick up the measured rotor imbalance values. This is achieved by providing each bar spring 1 and 2 of the two frames with different inertial moments. In the illustrated embodiment of the invention, the two lower-lying bar springs 2 of the two frames have, particularly when the weight of the rotor may cause a shifting of the oscillation node toward one of the measuring lines of the devices picking up the measuring values, greater angular impulses or inertial moments than the two upper rod springs 1.

In the embodiment of the invention as shown, the mounting strips 3 are components which are separate from the machine stand 5. Likewise, the mounting strips 4 are components which are separate from the rotor shaft housing 6. It is also possible to have the mounting strips 3 be component parts of the machine stand 5, and to have the mounting strips 4 be component parts of the rotor shaft housing 6.

The foregoing should be considered to be illustrative only of the principles of the invention. Numerous modifications and changes may occur to those skilled in the art. Accordingly, it is not desired to limit the invention to the exact construction and operation shown and described. All suitable modifications and equivalents that fall within the scope of the invention as defined by the appended claims may be resorted to.

I claim:

1. A device for measuring the imbalance of a rotor in two planes comprising:

a rotor shaft housing for a shaft of a rotor to be balanced in a balancing machine, said shaft extending along a rotor axis;

two pairs of two parallel bar springs each supporting the rotor shaft housing of the rotor on a machine stand in such a way that the parallel bar springs oscillate with respect to bar spring oscillation axes which are parallel to the rotor axis, the two pairs of springs being located in two parallel planes and substantially the same distance from the rotor axis;

two pairs of mounting strips running parallel to the rotor axis;

each pair of bar springs being joined together with one of said two pairs of mounting strips into a substantially rectangular one-piece frame, each mounting strip running parallel to the rotor shaft, one mounting strip of each one-piece frame fastened to the rotor shaft housing for the shaft of the rotor and the other mounting strip of each one piece frame fastened to the machine stand, said bar springs being substantially perpendicular to a plane passing through the mounting strips fastened to the rotor shaft housing and through said rotor axis.

2. A device in accordance with claim 1, wherein the one-piece frames are connected with the machine stand and the rotor mounting in such a way that they cannot be detached.

* * * * *